United States Patent
Passmore et al.

(10) Patent No.: US 10,964,094 B1
(45) Date of Patent: Mar. 30, 2021

(54) VISUALIZATION SYSTEM THAT TRANSFORMS 2D IMAGES OF OBJECTS SLICES INTO 3D POINT CLOUDS

(71) Applicant: VR Media Technology, Inc., Los Angeles, CA (US)

(72) Inventors: Charles Gregory Passmore, Los Angeles, CA (US); Sabine Bredow, Justin, TX (US)

(73) Assignee: VR Media Technology, Inc., Los Angeles, CA (US)

( * ) Notice: Subject to any disclaimer, the term of this patent is extended or adjusted under 35 U.S.C. 154(b) by 0 days.

(21) Appl. No.: 16/778,632

(22) Filed: Jan. 31, 2020

(51) Int. Cl.
*G06T 15/08* (2011.01)
*G06T 5/20* (2006.01)
*G06T 5/00* (2006.01)

(52) U.S. Cl.
CPC .............. *G06T 15/08* (2013.01); *G06T 5/002* (2013.01); *G06T 5/20* (2013.01); *G06T 2207/10024* (2013.01); *G06T 2207/10028* (2013.01); *G06T 2207/10056* (2013.01); *G06T 2207/20036* (2013.01); *G06T 2207/30024* (2013.01); *G06T 2210/41* (2013.01); *G06T 2210/56* (2013.01)

(58) Field of Classification Search
CPC ........... G06T 5/002; G06T 5/20; G06T 15/08; G06T 2207/10024; G06T 2207/10028; G06T 2207/10056; G06T 2207/20036; G06T 2207/30024; G06T 2210/41; G06T 2210/56
See application file for complete search history.

(56) References Cited

U.S. PATENT DOCUMENTS

| | | | |
|---|---|---|---|
| 2006/0098010 A1* | 5/2006 | Dwyer | G06T 19/006 345/424 |
| 2009/0034868 A1* | 2/2009 | Rempel | G09G 3/3426 382/264 |
| 2017/0323443 A1* | 11/2017 | Dhruwdas | G06T 7/0012 |
| 2019/0340775 A1* | 11/2019 | Lee | G01S 17/931 |
| 2020/0160554 A1* | 5/2020 | Zimmerman | G06T 7/11 |

* cited by examiner

*Primary Examiner* — Ke Xiao
*Assistant Examiner* — Jed-Justin Imperial
(74) *Attorney, Agent, or Firm* — ARC IP Law, PC; Joseph J. Mayo

(57) ABSTRACT

System that transforms 2D images of slices of an object, such as a tissue sample from a biopsy, into a 3D point cloud for visualization. 3D points may be generated for pixels in the 2D images with high luminance. Point depths may be assigned pseudo-randomly so that the points fill the space within the slice. The probability distribution for the random depths may be based on any characteristics of the 2D images. For example, points corresponding to pixels within large areas of high luminance may be spread relatively uniformly through the slice, while isolated points or points in small areas may be biased towards the minimum depth of the slice. Points in the point cloud may be partitioned into channels, corresponding for example to different stains of a sample, and may be visualized for example as different color assigned to points.

13 Claims, 17 Drawing Sheets
(12 of 17 Drawing Sheet(s) Filed in Color)

FIG. 5
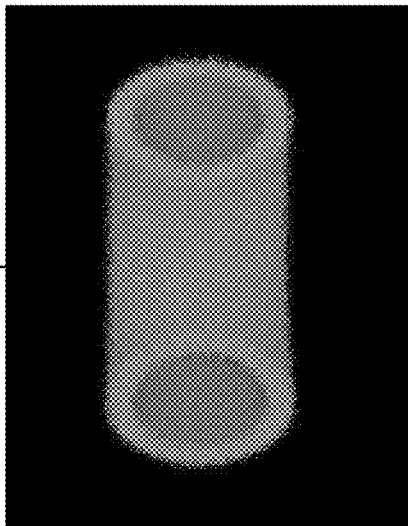
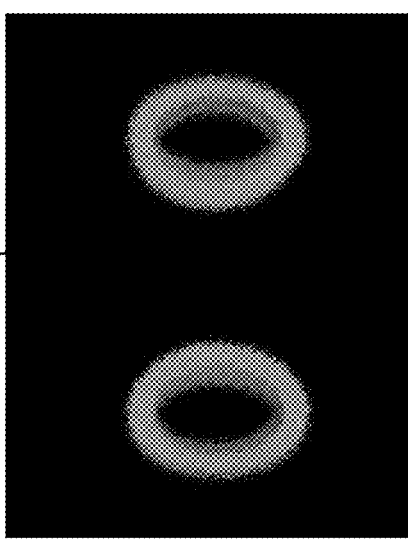
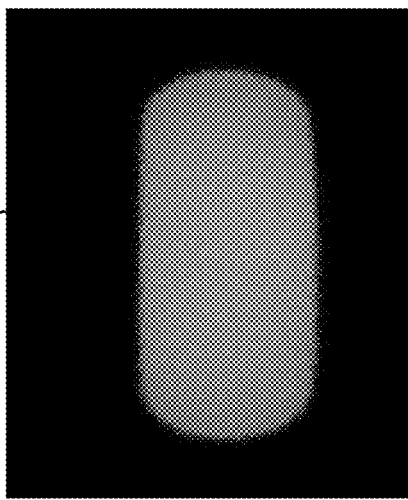
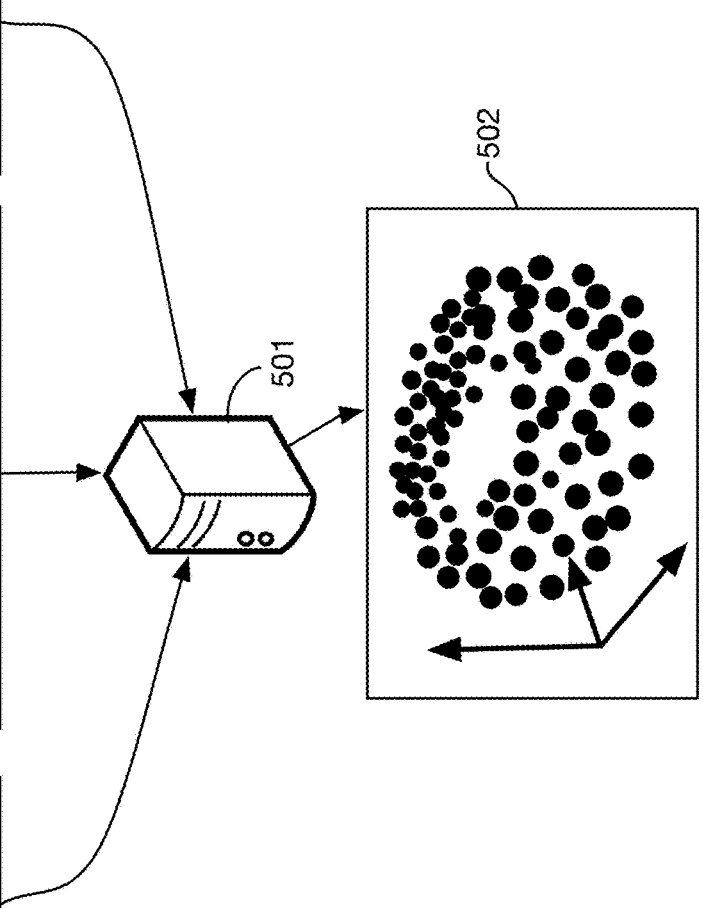

VISUALIZATION SYSTEM THAT TRANSFORMS 2D IMAGES OF OBJECTS SLICES INTO 3D POINT CLOUDS

BACKGROUND OF THE INVENTION

Field of the Invention

One or more embodiments of the invention are related to the fields of microscopy and image processing. More particularly, but not by way of limitation, one or more embodiments of the invention enable a system for visualization of objects as 3D point clouds that are generated from 2D images of object slices.

Description of the Related Art

To analyze tissue samples or other materials, laboratories typically take thin parallel slices of a sample and generate a microscopy image of each slice. Samples may be subjected to various stains or other treatments to highlight certain components in the slices. The result of the slicing and staining is therefore an array of 2D images of a sample, each corresponding to a particular slice and a particular stain.

It may be difficult to visualize the three-dimensional structure of a sample from the array of 2D images. The 2D images cannot be easily stacked on top of one another, because each may occlude the images below. This occlusion is particularly problematic with lower resolution images. Researchers or pathologists must therefore attempt to mentally construct 3D structures by successively viewing different images at different depths, and potentially with different stains. A more direct method of viewing the 3D structure of the sample would be preferable. Converting the 2D images into a 3D point cloud, which is not known in the art, allows direct visualization of the 3D structure without occlusion issues.

For at least the limitations described above there is a need for a visualization system that transforms 2D images of object slices into 3D point clouds.

BRIEF SUMMARY OF THE INVENTION

One or more embodiments described in the specification are related to a visualization system that transforms 2D images of object slices into 3D point clouds. The system may be used for example to visualize tissues samples by constructing a point cloud from microscopy images of tissue slices, possibly with various stains or other treatments.

One or more embodiments of the invention may include a processor, such as a desktop computer or server, that receives 2D images of object slices and transforms them into a 3D point cloud. With respect to a reference frame for the object, slices may be roughly parallel and may extend along width and height axes, and may vary in depth; each slice may be associated with a minimum depth and a maximum depth. The processor may obtain or generate a mapping between pixel coordinates of the 2D images and the width and height coordinates of corresponding points in the reference frame.

To generate 3D points of the point cloud, the processor may first filter each 2D image into a binary mask, and may generate a point corresponding to each "on" pixel in each mask. An illustrative filter sets a pixel in a binary mask to "on" if the luminance of the associated pixel in the 2D image equals or exceeds a threshold value. Alternatively, or in addition, a filter may include any combination of noise reduction, smoothing, convolution with a kernel, or morphological operations.

For 3D points generated from pixels of the binary masks, point widths and heights may be assigned based on the pixel coordinates. Point depths may be assigned randomly based on a depth probability distribution, which may differ for different points.

In one or more embodiments, multiple images may be taken of each slice. Each slice image may correspond to a channel, which may be associated for example with a stain of a tissue sample, or a wavelength of light used to illuminate the slice for imaging. Points in the 3D point cloud may be associated with a channel, and may be labeled according to the channel. The label may include for example a color, size, shape, text, opacity, or texture associated with the point.

An illustrative depth probability distribution may be a uniform distribution between the minimum and maximum depths associated with a slice. In one or more embodiments, a depth probability distribution for a point may be based on any characteristics of the associated pixel or image, or any characteristics of the entire set of 2D images. For example, one or more embodiments may select or modify the depth probability distribution for a point based on the size of a region in the binary mask that contains the point. This region may be for example the set of pixels in the binary mask that have on values and that are connected to the pixel in the binary mask corresponding to the by a path of contiguous pixels with on values. The region size may be for example the area of the convex hull containing this region.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIG. 3A shows a view of this model with all channels (colors) selected. FIG. 3B shows a view with one channel hidden. FIGS. 3C and 3D show zoomed-in views of sections of the model.

FIG. 5 illustrates a system that combines and processes the 2D images from the slices of FIG. 4 to form a 3D point cloud for visualization.

DETAILED DESCRIPTION OF THE INVENTION

A visualization system that transforms 2D images of object slices into 3D point clouds will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
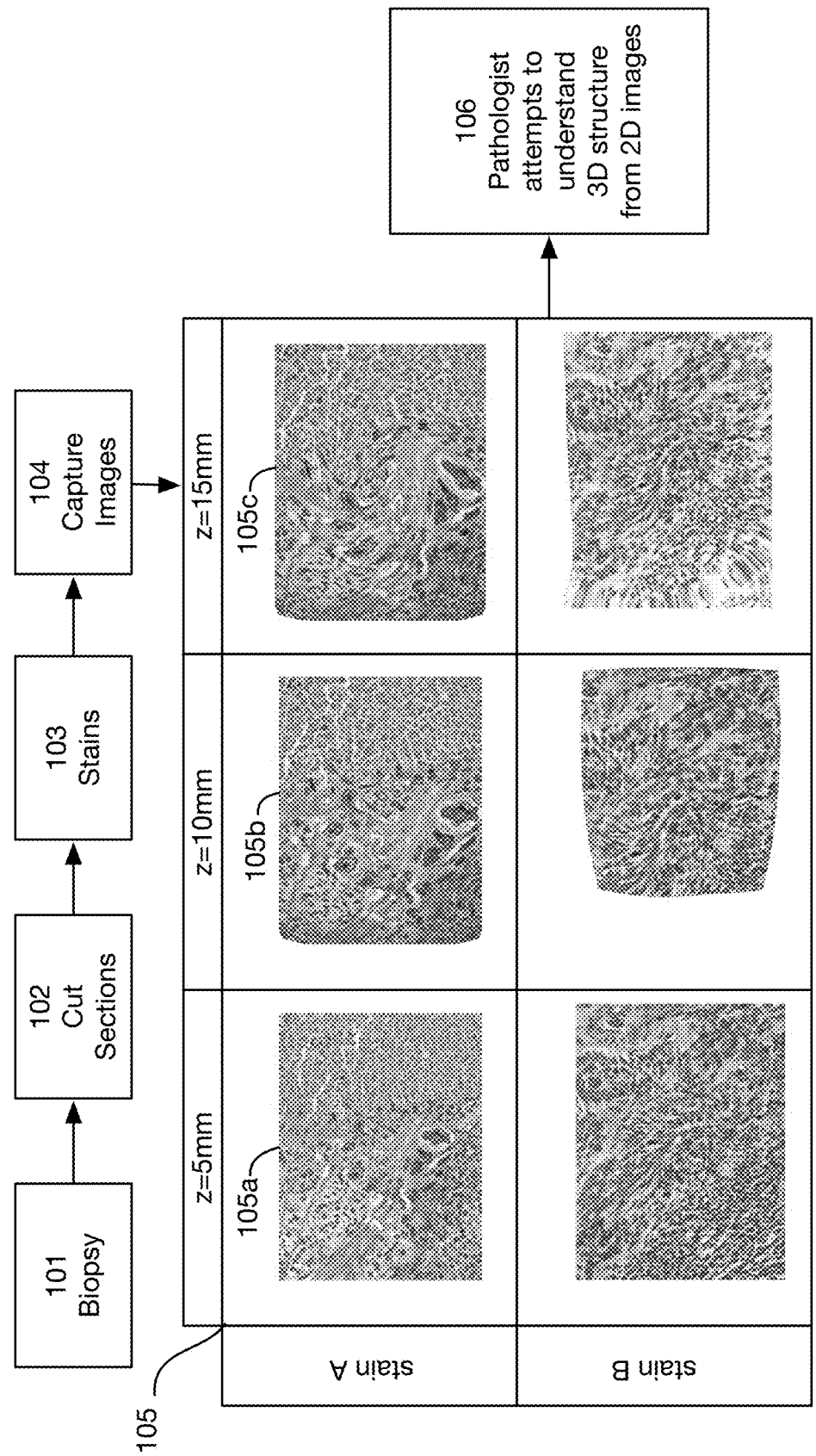
FIG. 1 illustrates a process used in the prior art to analyze tissue samples, which relies on the pathologist to visualize the tissue structure from an array of 2D images.

Embodiments of the invention may be used to generate 3D point clouds to visualize any type or types of objects or systems. An illustrative application is the visualization of tissue samples, for example from a biopsy. FIG. 1 shows a typical method used in the prior art to generate images of such a sample. A biopsy 101 generates a tissue sample, which is then cut in step 102 into sections, which are typically thin parallel sheets. In step 103, one or more stains may be applied to the sections, and in step 104 images of each stained section are captured, for example using a microscope. The resulting 2D images shown in table 105 may correspond for example to images at different depths and under different stains. For example, images 105a, 105b, and 105c are images of three slices at three different depths, each with the same stain. In step 106, a pathologist or researcher reviews the table of 2D images 105, and may for example attempt to understand the three-dimensional structure of the tissue sample from these images. Comprehending the 3D shape of the sample features from the 2D image array 105 is often complex or impossible.

Figure 2:
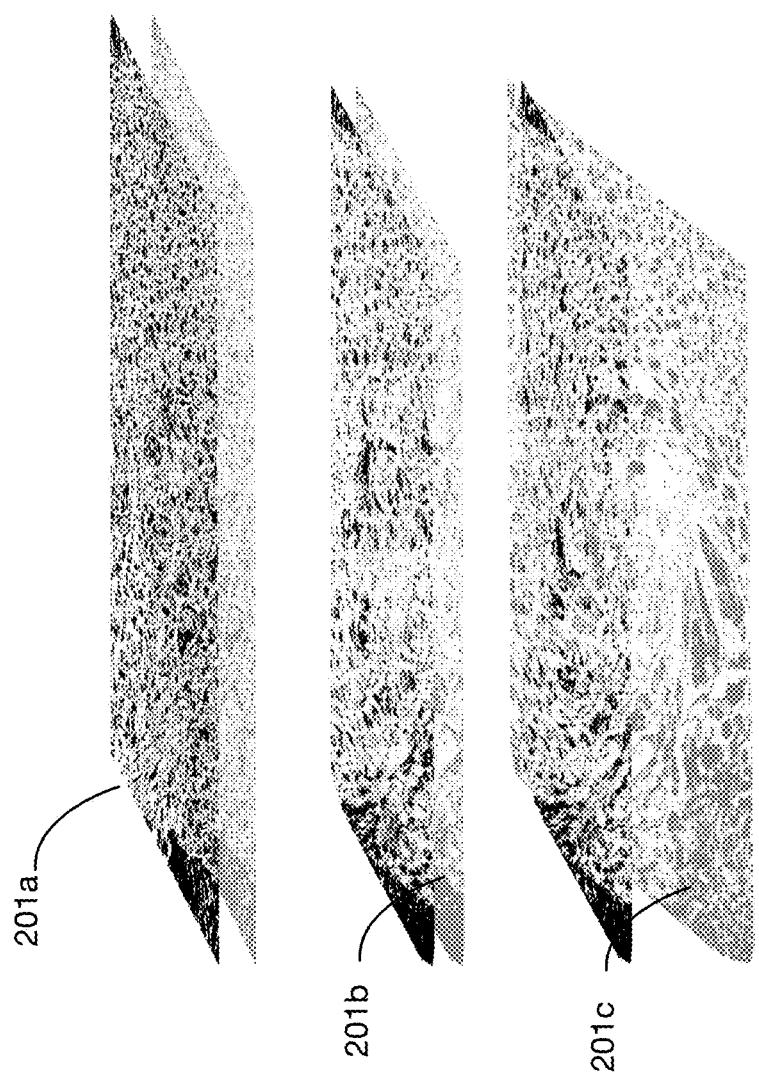
FIG. 2 illustrates a simple voxel model generated from the images of FIG. 1; 3D visualization of this model is limited due to occlusions.

A preferred approach would be to provide a method for direct 3D visualization of the sample. One existing method for generating a 3D model of the sample is illustrated in FIG. 2. High intensity pixels in each 2D image are mapped into voxels that fill the depth occupied by the corresponding slice, and a 3D binary model may be generated by stacking these voxel slices on top of one another. For example, voxel array 201a may correspond to image 105a, voxel array 201b may correspond to image 105b, and voxel array 201c may correspond to image 105c. While this method provides some degree of 3D visualization, it is difficult to view the 3D structure due to occlusion between voxels. This problem may be particularly acute for images that are of relatively low resolution.

One or more embodiments of the invention address the visualization difficulties illustrated in FIGS. 1 and 2 by transforming 2D images into 3D point clouds. The point clouds present fewer occlusion issues, and they are better able to represent structures with variable depths than the simple voxel filling model shown in FIG. 2. FIGS. 3A through 3D show illustrative point clouds generated by an embodiment of the invention; FIGS. 4 through 14 show illustrative steps that may be used to generate these point clouds.

Figure 3A:
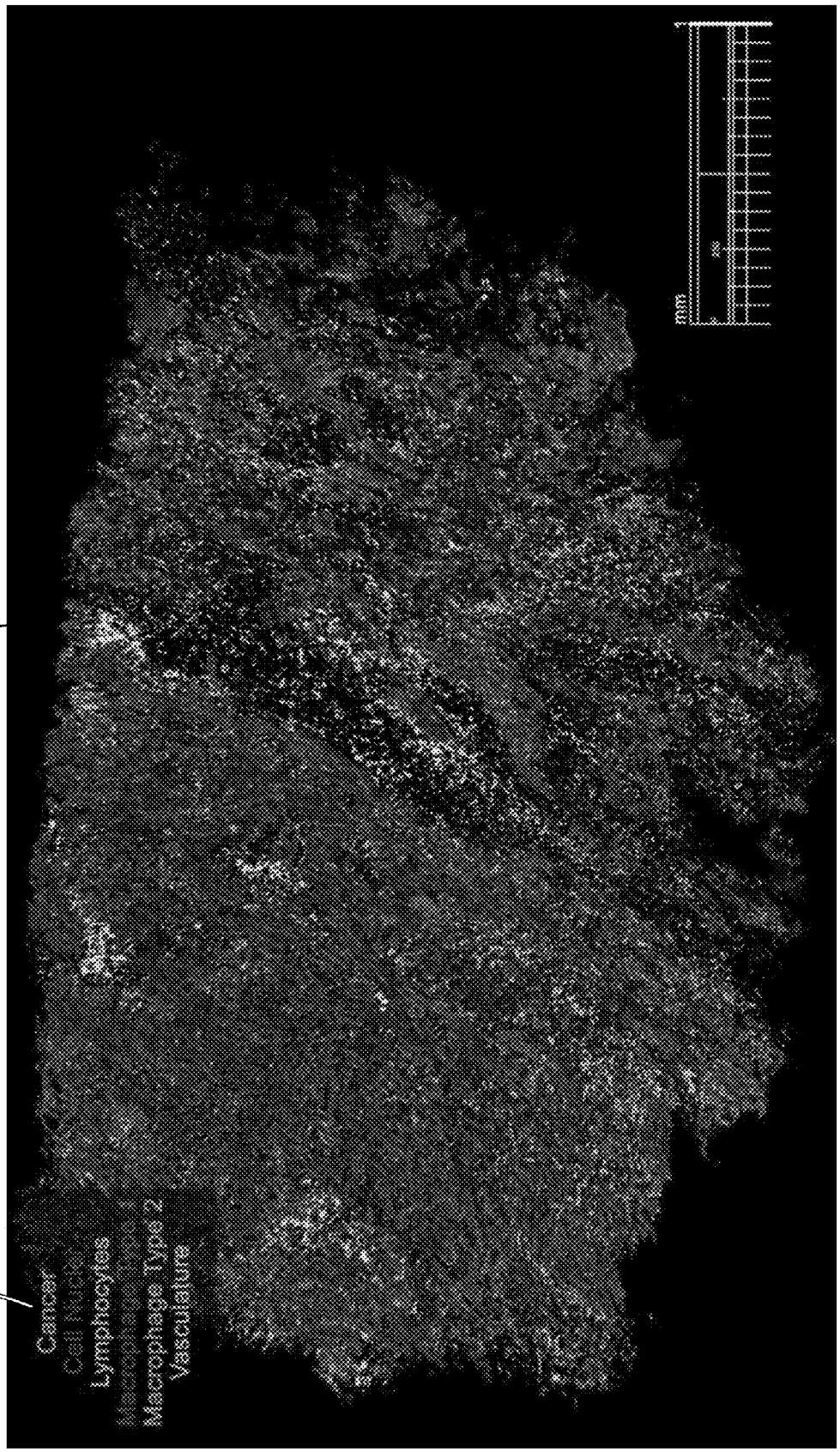
FIGS. 3A through 3D show illustrative images of 3D point cloud models generated by an embodiment of the invention.
Figure 3B:
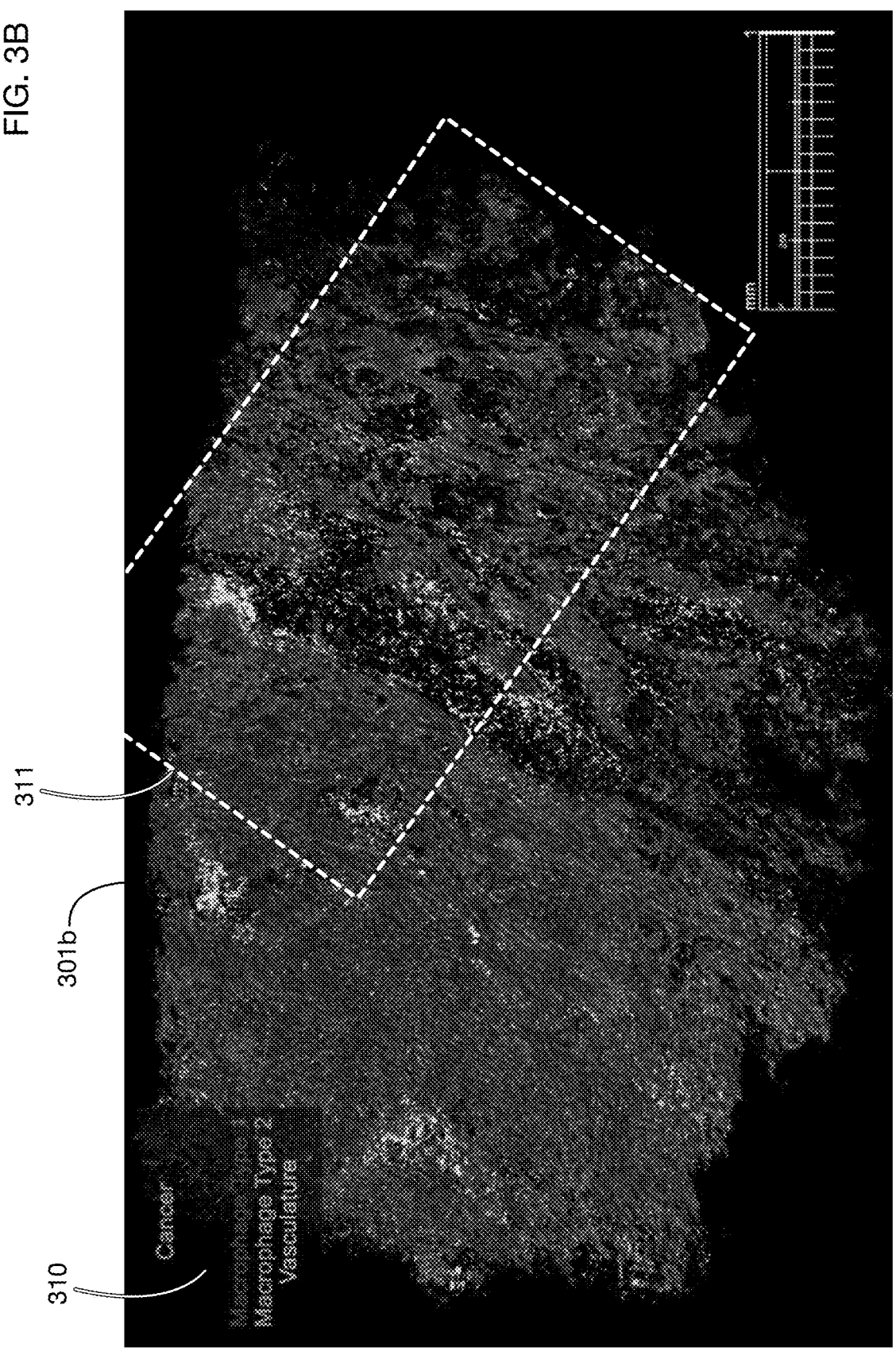
Figure 3C:
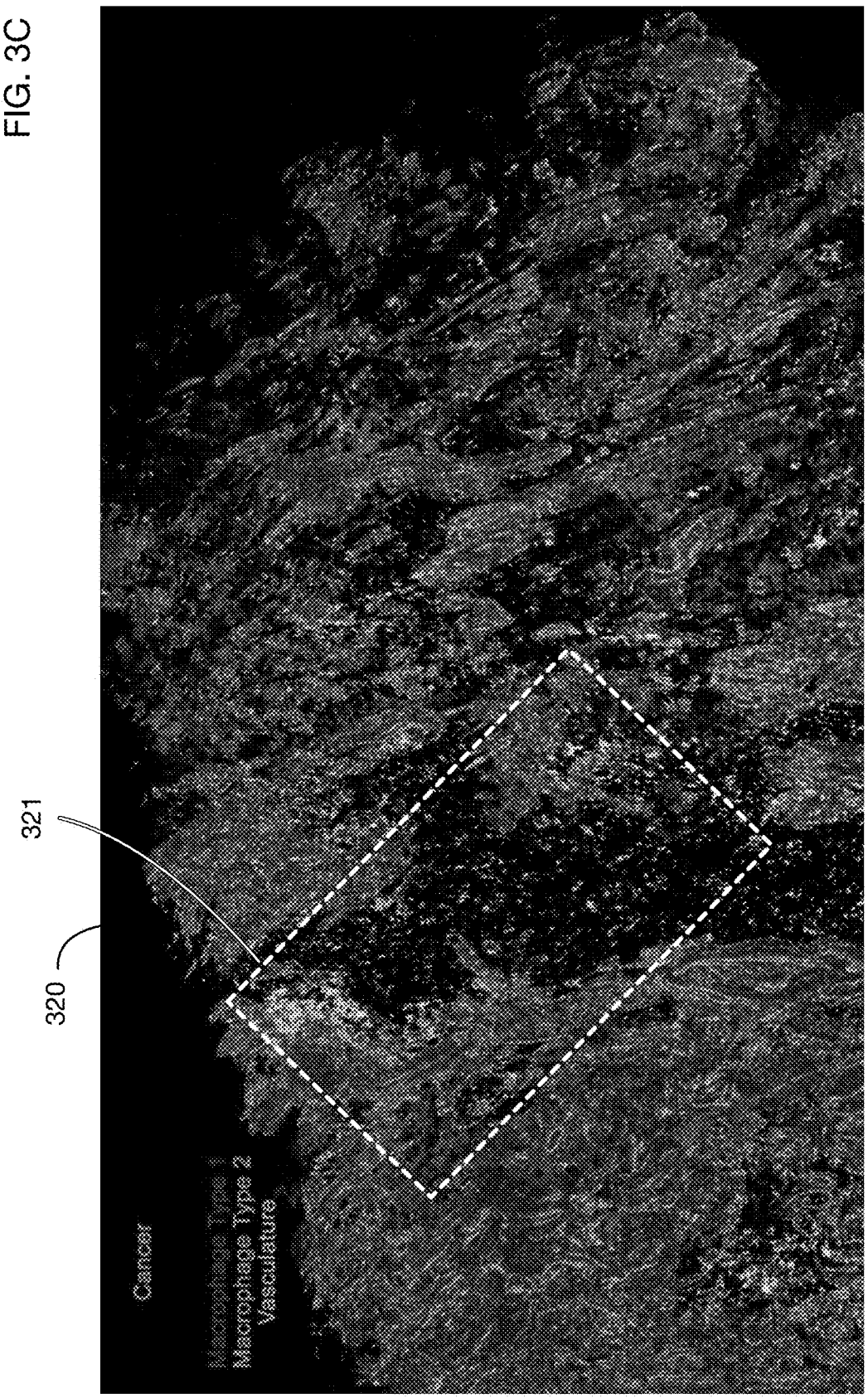
Figure 3D:
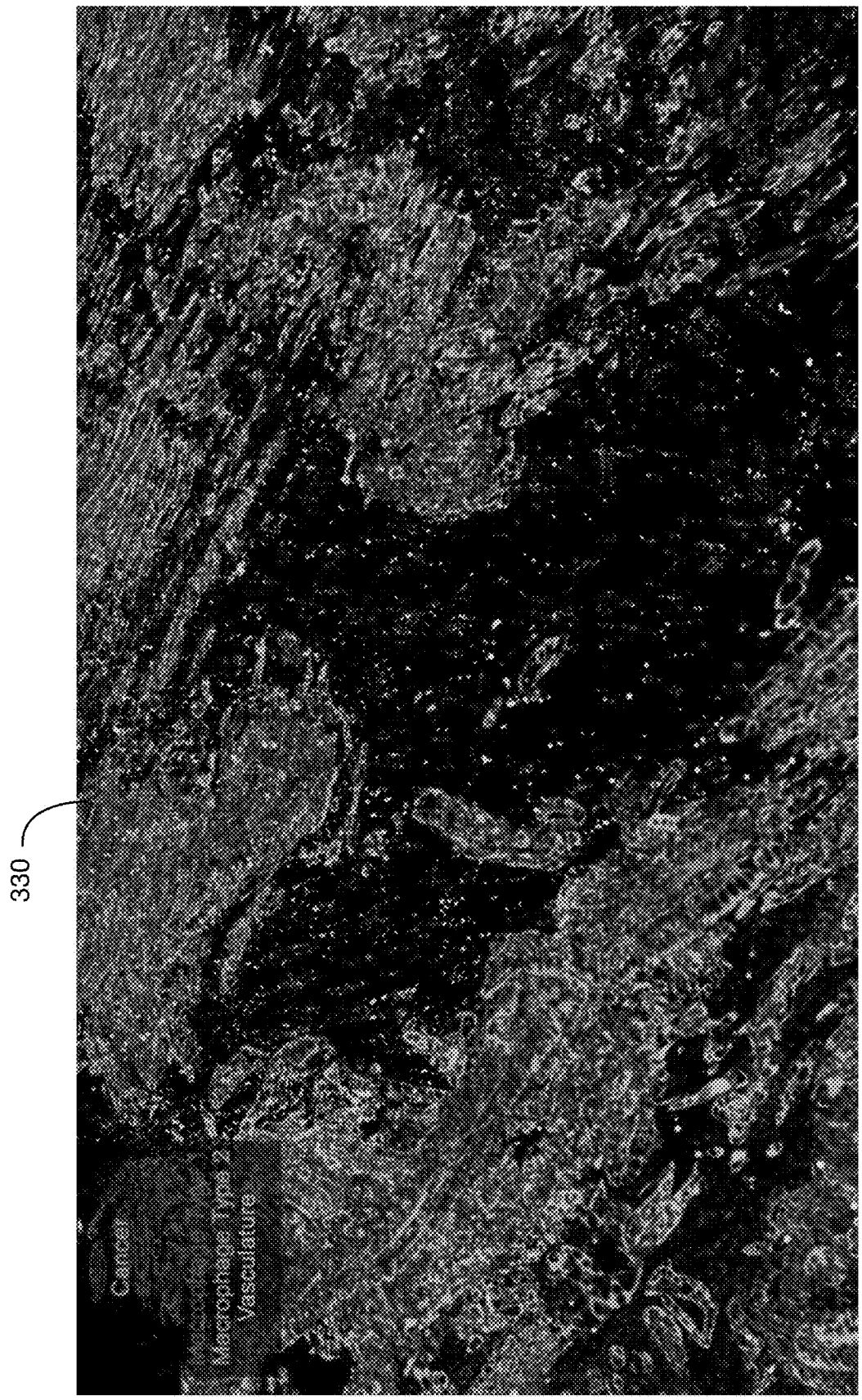

FIG. 3A shows an illustrative point cloud 301a generated from a large sequence of 2D images of a tumor sample at different depths and under different stains (and potentially imaged with different wavelengths of light). Different types of structures, which may for example correspond to different stains or wavelengths, are coded with different colors 302. A researcher or pathologist may then examine the point cloud 301a using 3D navigation tools, for example rotating, zooming, or flying around or into the structure of the point cloud. Because the points occupy little space, occlusion is minimal. However, clusters of points correspond to significant structures, and these are easily visualized from the points. FIG. 3B shows the same point cloud but a particular channel 310 (a stain, for example) is deselected, so that the viewer can focus on other structures in the point cloud 301b. In one or more embodiments any number of channels corresponding to stains, wavelengths, or any other features may be selected, deselected, recolored, resized, or otherwise highlighted. If the viewer zooms in to region 311, the resulting view 320 in FIG. 3C shows that region in detail. Further zooming in to region 321 results in view 330 in FIG. 3D. At each zoom level, structures remain visible because the points are resized to a size that is appropriate for that zoom level; thus occlusion of inner structures is minimized.

Figure 4:
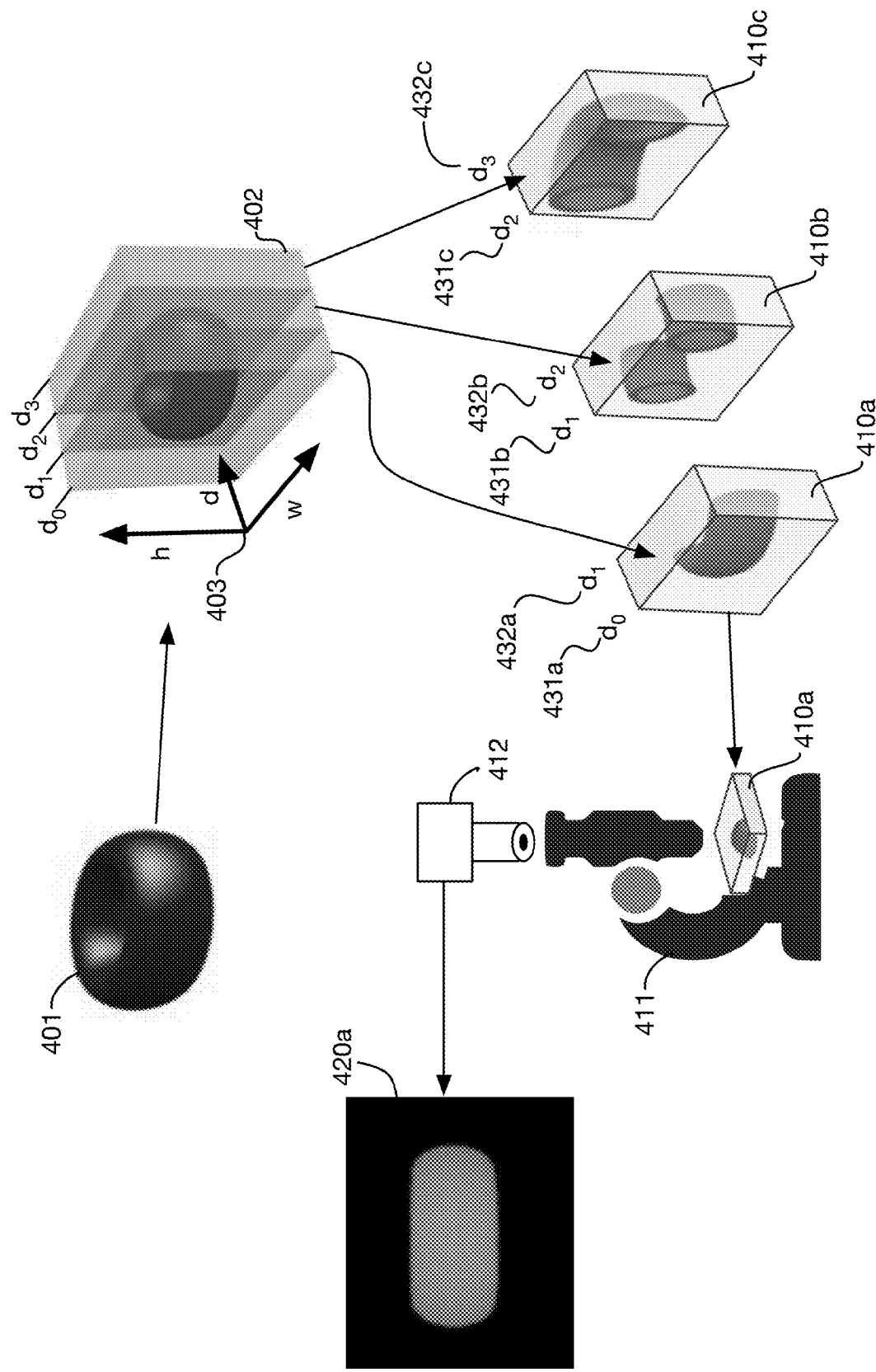
FIG. 4 shows an overview of a process that may be used to prepare sample slices for imaging.

FIG. 4 shows an illustrative example of a preliminary step that may be used in one or more embodiments to generate a 3D point cloud. An object 401, in this case a donut-shaped object, is first divided into slices. In the example shown, the slices are parallel sheets 402. For example, a coordinate system 403 may be created with a width axis, a height axis, and a depth axis. The front and back faces of the slices may be perpendicular to (or substantially perpendicular to) the depth axis; and each sheet may occupy a range of depths between a corresponding minimum depth and maximum depth. In FIG. 4, slice 410a lies between minimum depth 431a and maximum 432a, slice 410b lies between minimum depth 431b (which may equal 432a) and maximum depth 432b, and slice 410c lies between minimum depth 431c (which may equal 432b) and maximum depth 432c. One or more 2D images are then generated for each of the slices 410a, 410b, and 410c. For example, slices may be placed in a microscope 411 with a camera 412. Illustrative 2D image 420a shows the result of imaging slice 410a.

In one or more embodiments, an object may be divided into any types of sections, including but not limited to slices that are parallel sheets. These sections need not have the same shape or size. To construct a point cloud from the images of the sections, it is only necessary that each section be associated with or mappable to coordinates in some common coordinate system 403.

FIG. 5 shows an overview of a system that converts 2D images captured by a process such as that shown in FIG. 4 into a 3D point cloud. Images 420a, 420b, and 420c of slices or other sections are input into a processor 501, which generates a 3D point cloud 502. The point cloud 502 may for example contain a set of points in a 3D coordinate system. This coordinate system may be in some situations identical to or related to the coordinate system 403 that may be defined on the object and its slices or sections. In one or more embodiments, points of the point cloud 502 may have other characteristics or attributes in addition to location in 3D space; for example, as described below with respect to 14, points may be assigned colors that may correspond to stains or other conditions under which the 2D images were captured. Processor 501 may be any type of computing system including for example, without limitation, a microprocessor, a desktop computer, a laptop computer, a notebook computer, a tablet, a server, a phone, a GPU, or a network or combination of any of these devices.

Figure 6:
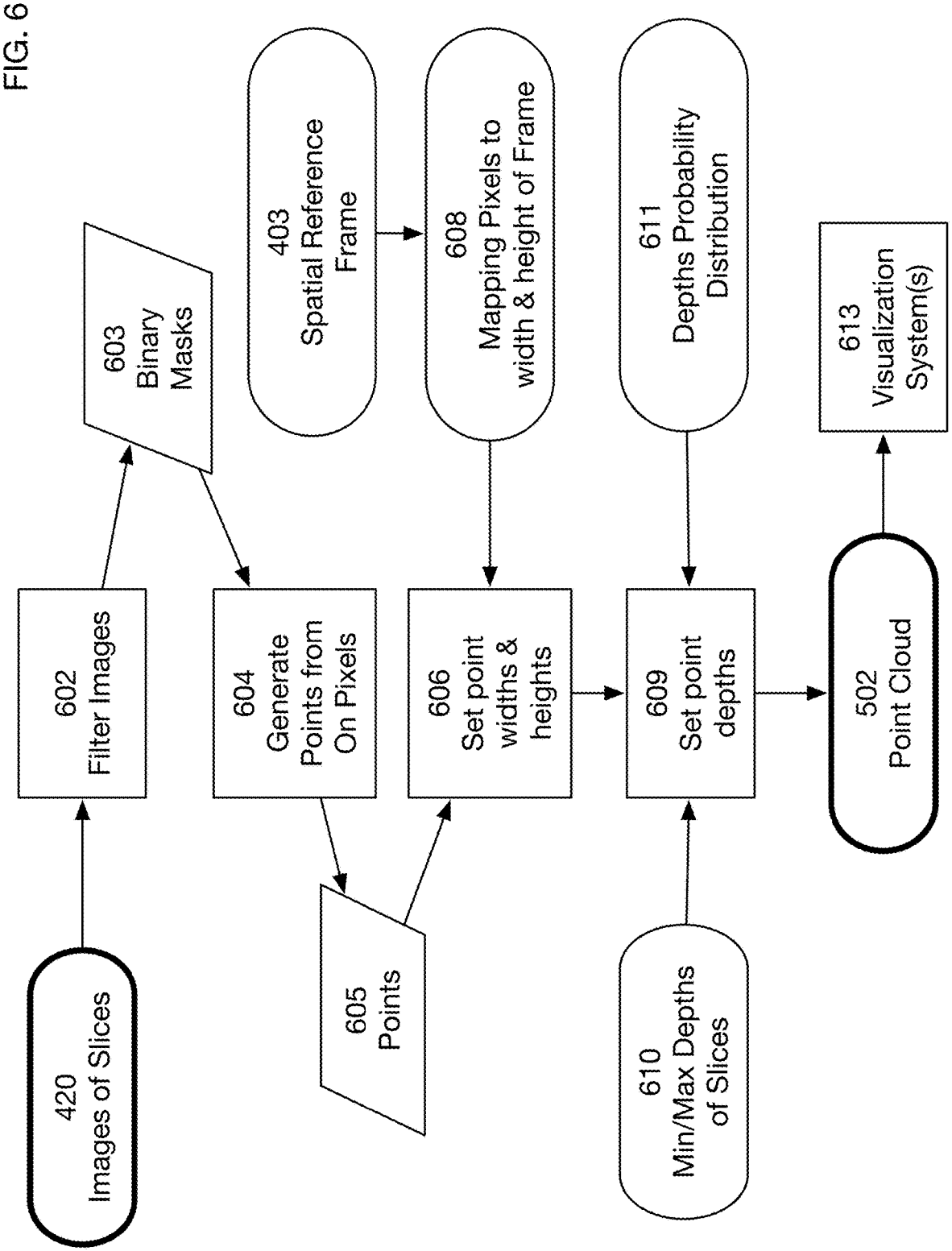
FIG. 6 shows an illustrative flowchart of processing steps that may be performed in one or more embodiments to transform slice images to a point cloud.

FIG. 6 shows an illustrative flowchart of steps that may be performed in one or more embodiments by processor or processors 501 to map 2D images 420 of object slices into a 3D point cloud 502. In step 602, images 420 are filtered, to generate for example binary masks 603, each corresponding to one of the 2D images 420. These binary masks may have for example "on" pixels corresponding to high intensity pixels in the original 2D images, and "off" pixels corresponding to low intensity pixels in the original images. In one or more embodiments additional filtering operations may be performed on the images 420, including for example, without limitation, noise reduction, smoothing, convolution with any desired kernels, or morphological operations. In step 604, the "on" pixels from the binary masks 603 are converted into points 605. These points may be originally in the same coordinate space as the 2D image; they may need to be mapped to a 3D coordinate system. A spatial reference frame 403, such as the coordinate system 403 of FIG. 4, may be defined for the object being converted to a point cloud. This reference frame 403 may be in any units; it may or may not correspond to physical measurements of the object. This reference frame or coordinate system 403 may determine a mapping 608 between pixels of the 2D images and width and height coordinates in reference frame 403. (The terms "width" and "height" may be applied to any axes in the frame 403.) In step 606, each of the points 605 may be assigned a width and height in reference frame 403 based on mapping 608. Then in step 609, each of the points 605 may be assigned a depth coordinate. (The term "depth" may be applied to any axis in the frame 403.) Typically, but not necessarily, the depth of each point may be in the range 610 between the minimum and maximum depth of the slice associated with the 2D image from which the point is generated. Within this range (or in another suitable range), in one or more embodiments depths may be assigned in a random or pseudo-random manner, based for example on a probability distribution 611 (which may vary by point), as described and illustrated below. The points 605 with width, height, and depth assigned are then combined into 3D point cloud 502, which may be viewed for example using a visualization system 613.

Figure 7:
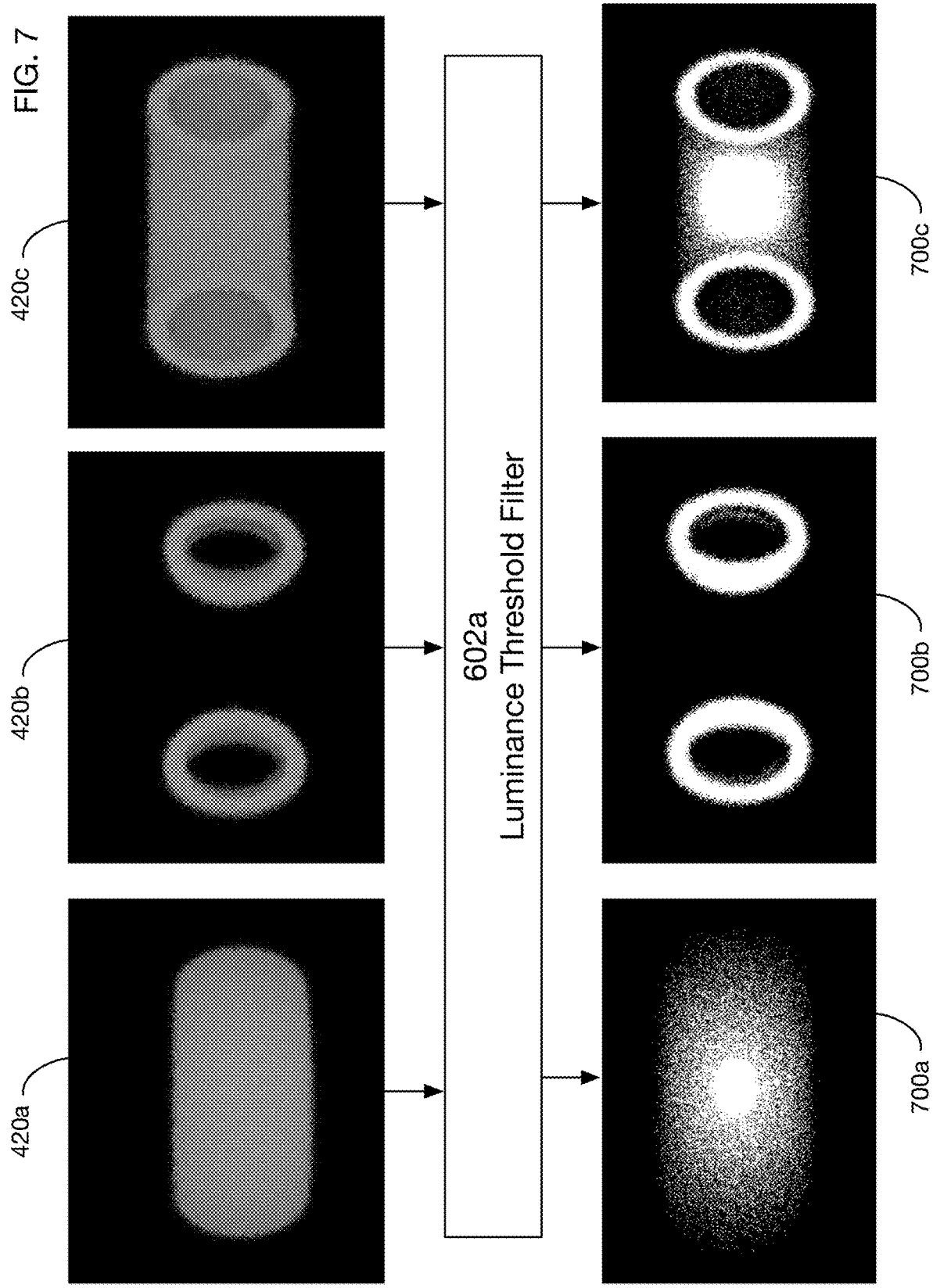
FIG. 7 illustrates an embodiment of a filtering step applied to the images of FIG. 5.

FIGS. 7 through 12 illustrate selected steps of the flowchart of FIG. 6 applied to the images 420a, 420b, and 420c of FIG. 6. FIG. 7 shows an illustrative filtering step 602a, which in this embodiment converts grayscale images 420a, 420b, and 420c into binary images (binary masks) 700a, 700b, and 700c, respectively. This filter 602a may be for example a luminance threshold filter, which sets a pixel in the filtered image to "on" only if the luminance of the corresponding pixel in the grayscale image equals or exceeds a threshold. In one or more embodiments, thresholds may be applied to any pixel feature or features, including but not limited to luminance. In one or more embodiments, the value of a filtered pixel may depend on neighboring pixels as well as the value of the pixel itself.

Figure 8:
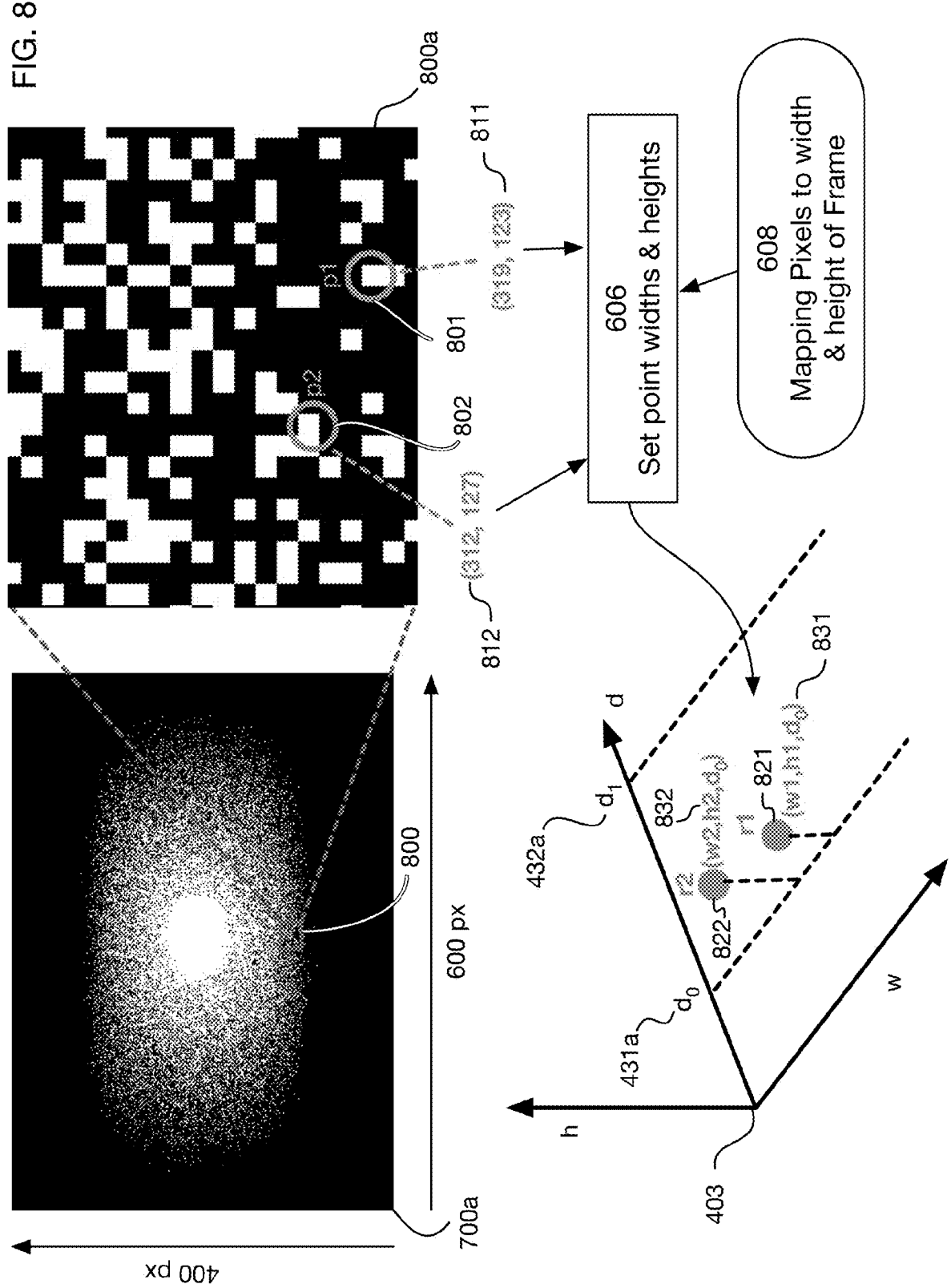
FIG. 8 illustrates an initial mapping of pixels of filtered images into 3D points.

The pixels in filtered images 700a, 700b, and 700c with "on" values (set to 1 in the binary image, and visualized as white pixels in the filtered images) may then be converted to 3D points in the 3D point cloud. A first step 606 is to assign a width and height to each such point. This process is illustrated in FIG. 8 for selected pixels of filtered image 700a. Image 800a shows a zoomed-in view of region 800 in image 700a. Illustrative "on" (white) pixels 801 and 802 have pixel coordinates 811 and 812, respectively, in the pixel coordinate system of image 700a. Mapping 608 transforms these pixel coordinates into point widths and heights in reference frame 403. The depth coordinate of each point derived from a pixel may be initially set to a constant value for each point in a 2D image, corresponding for example to the minimum depth of the slice associated with the image. For example, image 700a corresponds to slice 410a (see FIG. 4) with minimum depth 431a, so the 3D points generated from the pixels of image 700a may be assigned depth 431a initially. Pixel 801 is therefore mapped to point 821 at coordinates 831 in reference frame 403, and pixel 802 is mapped to point 822 at coordinates 832.

Figure 9:
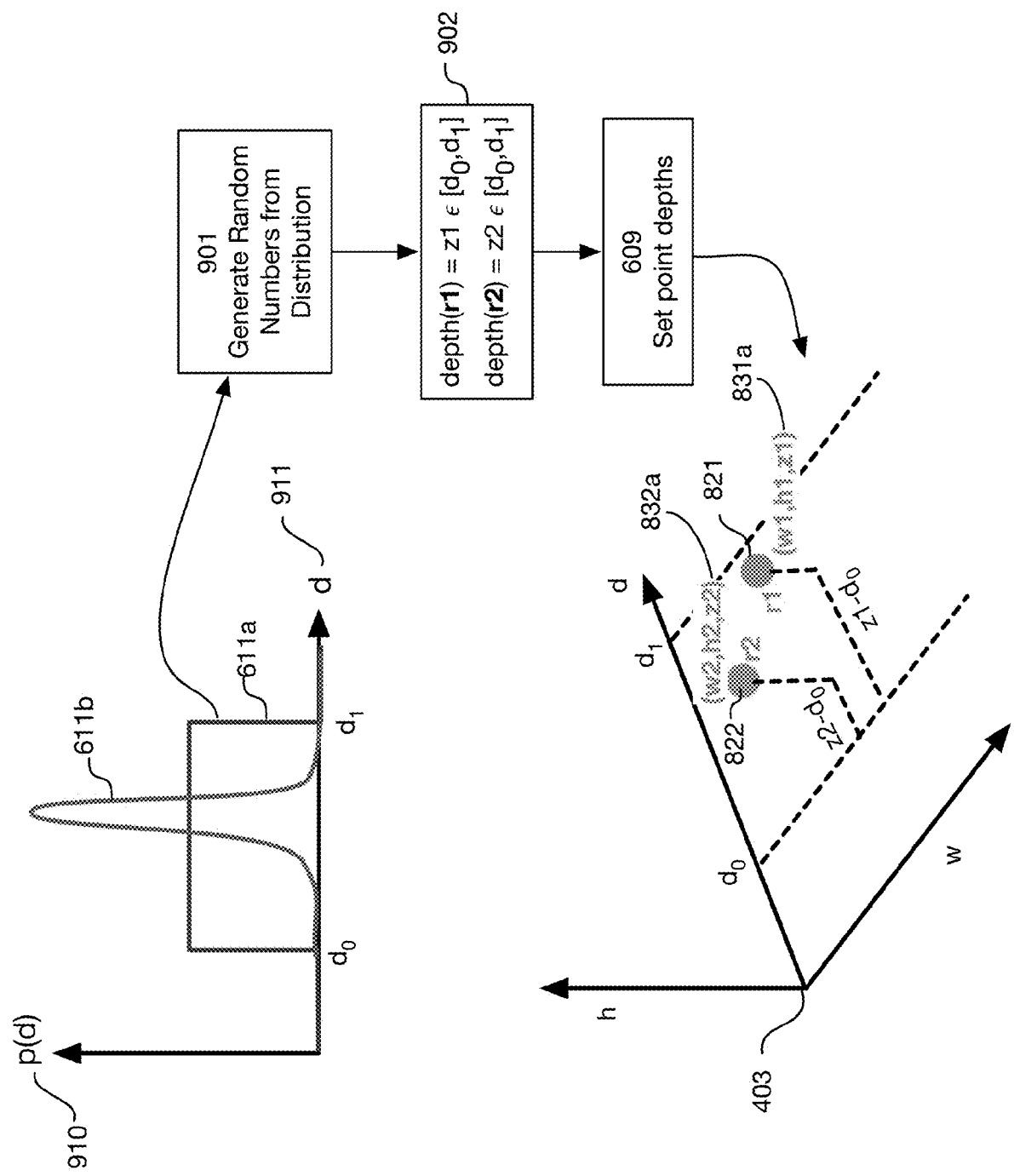
FIG. 9 illustrates adjusting the depth of the 3D points (mapped from pixels) of FIG. 8 based on a depth probability distribution.

After setting the width and height of 3D points (and possibly assigning an initial depth), step 609 may set or adjust the depth of each 3D point. This step ensures that the 3D points occupy the 3D space of the object's point cloud, instead of remaining in flat sheets as would be the case if each point were simply assigned the minimum depth as shown in FIG. 8. FIG. 9 shows an illustrative process that may be used to assign point depths. Depths may be assigned using random number generation 901, which generates depth values for points randomly (or pseudo-randomly) based on one or more probability distributions 910 for depth 911. For example, FIG. 9 shows two illustrative probability distributions: distribution 611a, a uniform distribution between the minimum and maximum depth of a slice, and distribution 611b, which may be for example a normal distribution. These distributions are illustrative; one or more embodiments may use any type of probability distribution for depth values. Probability distributions may be selected or modified based on various image characteristics, as described below. In FIG. 9, depths 902 are assigned to points 821 and 822; these depth values shift the 3D coordinates of the points 821 and 822 to 831a and 832a, respectively. The points no longer lie along the sheet at the minimum depth value, as they did in the initial coordinate assignments of FIG. 8. The resulting 3D point cloud therefore provides a more realistic visualization of the imaged object, since points are spread throughout the space of the object.

Figure 10:
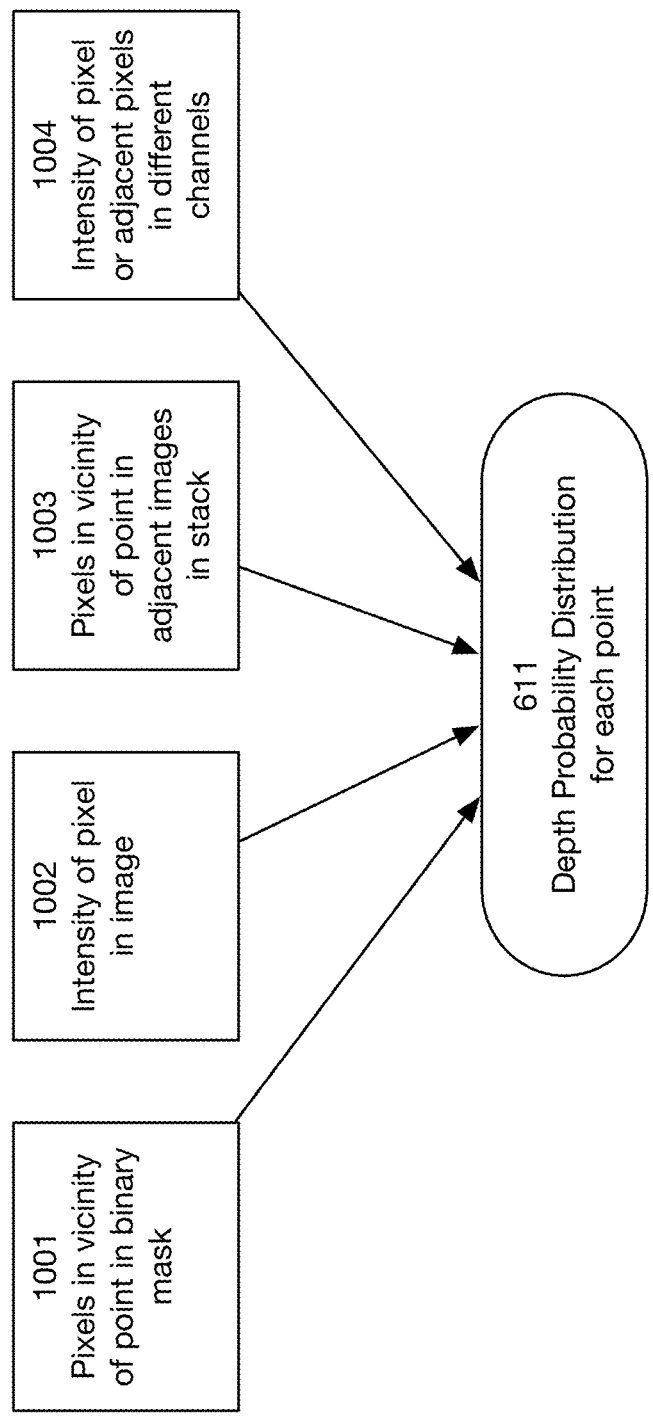
FIG. 10 shows illustrative factors that may affect the probability distribution used to generate point depths.

FIG. 10 shows illustrative factors that may affect the probability distribution 611 used to select the depth for a point. This distribution may be different for different points. Factors that affect each point's depth probability distribution may be any characteristics or data of the original or filtered images. For example, distribution 611 for a point may be based on or affected by any or all of: values 1001 of pixels in the vicinity of the point, in either a binary (filtered) or original (grayscale or color) image; the intensity 1002 of the pixel associated with the point in the original image; the values 1003 of pixels in the vicinity of the point in adjacent or nearby images in a depth stack; and the intensity 1004 of the pixel or of nearby pixels in different channels (for example in images taken with different stains). These factors are illustrative; one or more embodiments may use any function of any pixels, regions, or images to select or derive a probability distribution for a point.

Figure 11:
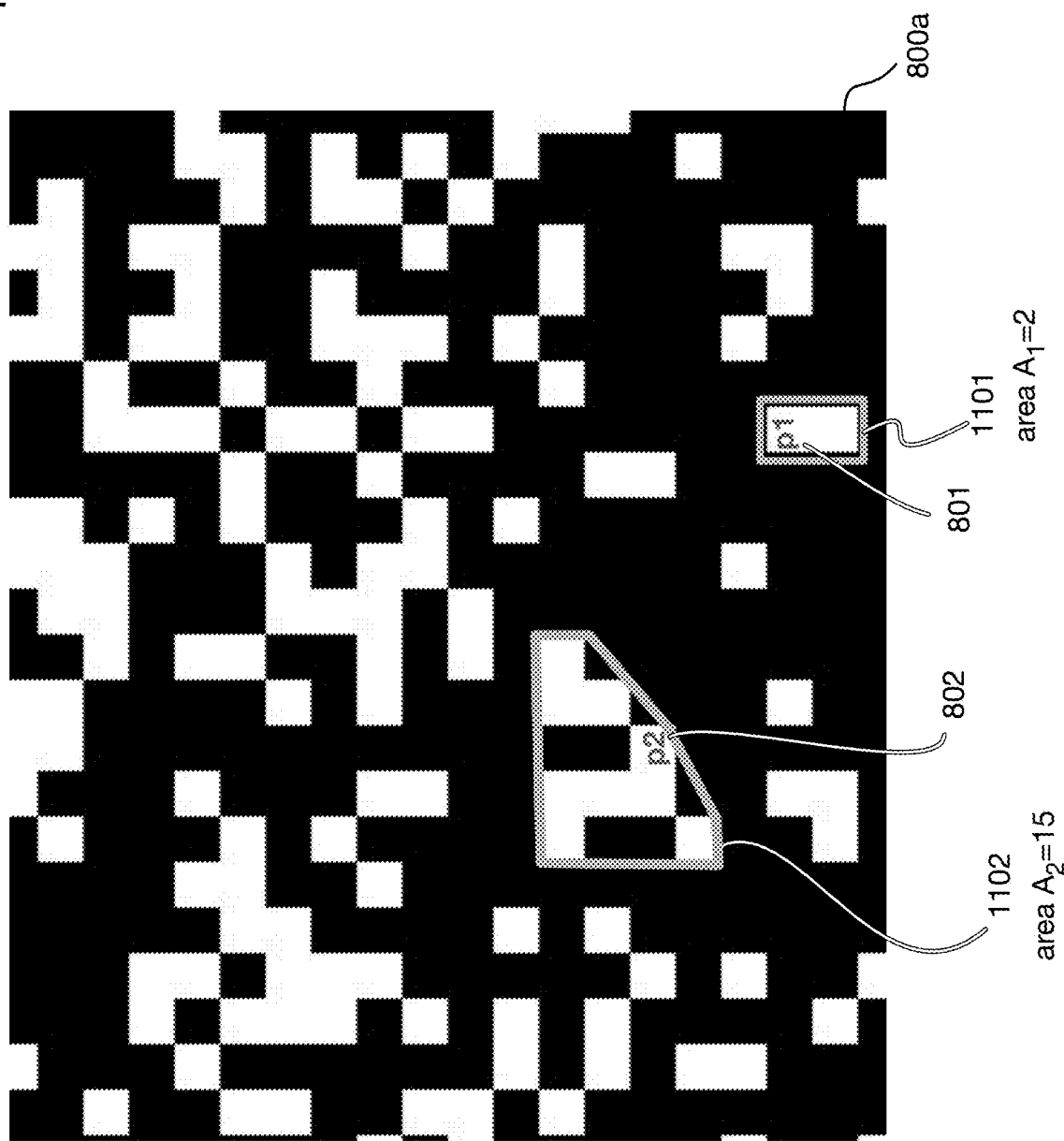
FIG. 11 illustrates one of the factors that may affect the depth probability distribution: the size of a pixel region from which a 3D point is derived.
Figure 12:
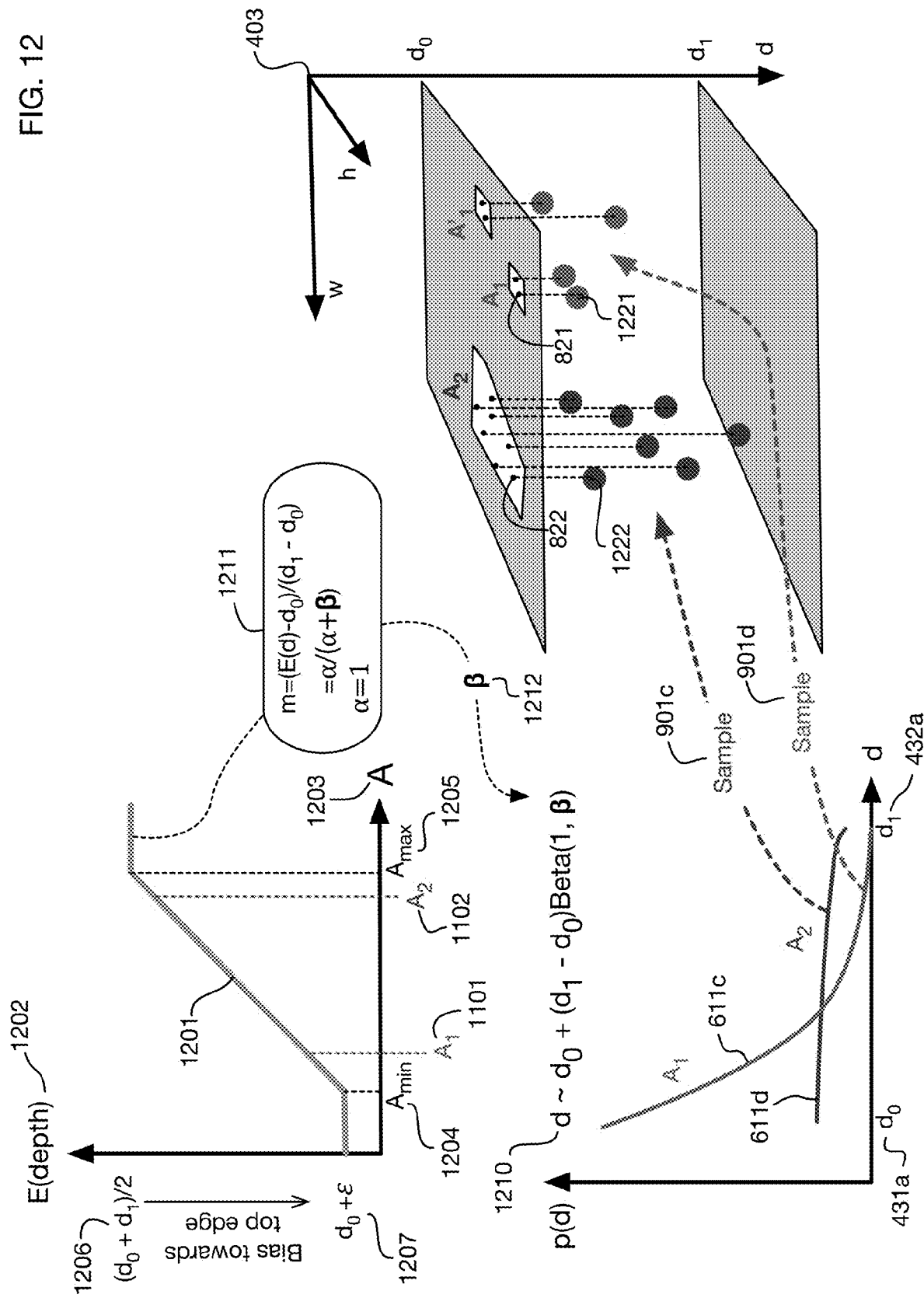
FIG. 12 shows illustrative depth probability distributions that depend on the pixel region areas illustrated in FIG. 11.

FIGS. 11 and 12 show an illustrative example of modifying a depth probability distribution based on the values of pixels in the vicinity of a point. In this example, the depth probability distribution of a point depends on the size of the area of pixels a point is contained in; the larger this area, the more the probability distribution is spread throughout the depth range (between minimum and maximum depth of the corresponding slice), instead of being biased towards the minimum depth. A possible intuition associated with this scheme is that larger areas in an image may represent larger three-dimensional structures within an object, which may penetrate more deeply into or through the corresponding slice. FIG. 11 shows the areas associated with the illustrative points 801 and 802 in image region 800a from FIG. 8. The area in which a point is contained may be defined for example as the convex hull of the "on" pixels that are connected to the point by a path of contiguous pixels with "on" values. For example, area 1101 contains point 801, and area 1102 contains point 802. The size of each area (in pixels for example) may then be used to modify the depth probability distribution for the points contained in the area. This process is shown in FIG. 12. For illustration, depth probability distribution family 1210 uses a beta distribution parameterized by parameter 1212, which is derived based on the area 1203 of the region in which the associated point is contained. This parameter 1212 is calculated based on relationship 1211 between the parameter and the expected value 1202 of the probability distribution. The expected depth 1202 for the distribution assigned to a point follows linear interpolation curve 1201, which sets the expected depth to a value 1207 very close to the minimum depth for areas at or below a value 1204, and to a value 1206 at the midpoint between minimum and maximum depth for areas at or above a value 1205. For the illustrative areas 1101 and 1102 of FIG. 11, the corresponding depth probability distributions are 611c and 611d, respectively. Distribution 611c biases the point depths towards the minimum depth value 1207, whereas distribution 611d is closer to a uniform distribution between minimum depth 431a and maximum depth 432c. For each point within these areas, samples are taken from the associated probability distribution; for example, point 821 has a sample depth 901d taken from distribution 611c, resulting in point coordinates 1221, and point 822 has a sample depth 901c taken from distribution 611d, resulting in point coordinates 1222. Since area 1102 is larger than area 1101, the points such as point 1222 from area 1102 are spread more uniformly through the space between the minimum and maximum depth than those from area 1101, which are biased more towards the minimum depth.

The probability distributions and calculations shown in FIG. 12 are illustrative; one or more embodiments may use any distributions and may modify them based on any factors, including but not limited to those described with respect to FIG. 10. As another illustrative example, the depth distribution for a point may depend in one or more embodiments on whether the point appears in both the image from which it is taken and the image at the next depth; if the point appears in both images, then the depth may be assigned from a uniform distribution between the minimum and maximum depth, under the assumption that the point belongs to a three dimensional structure that penetrates the entire depth of the slice.

Figure 13:
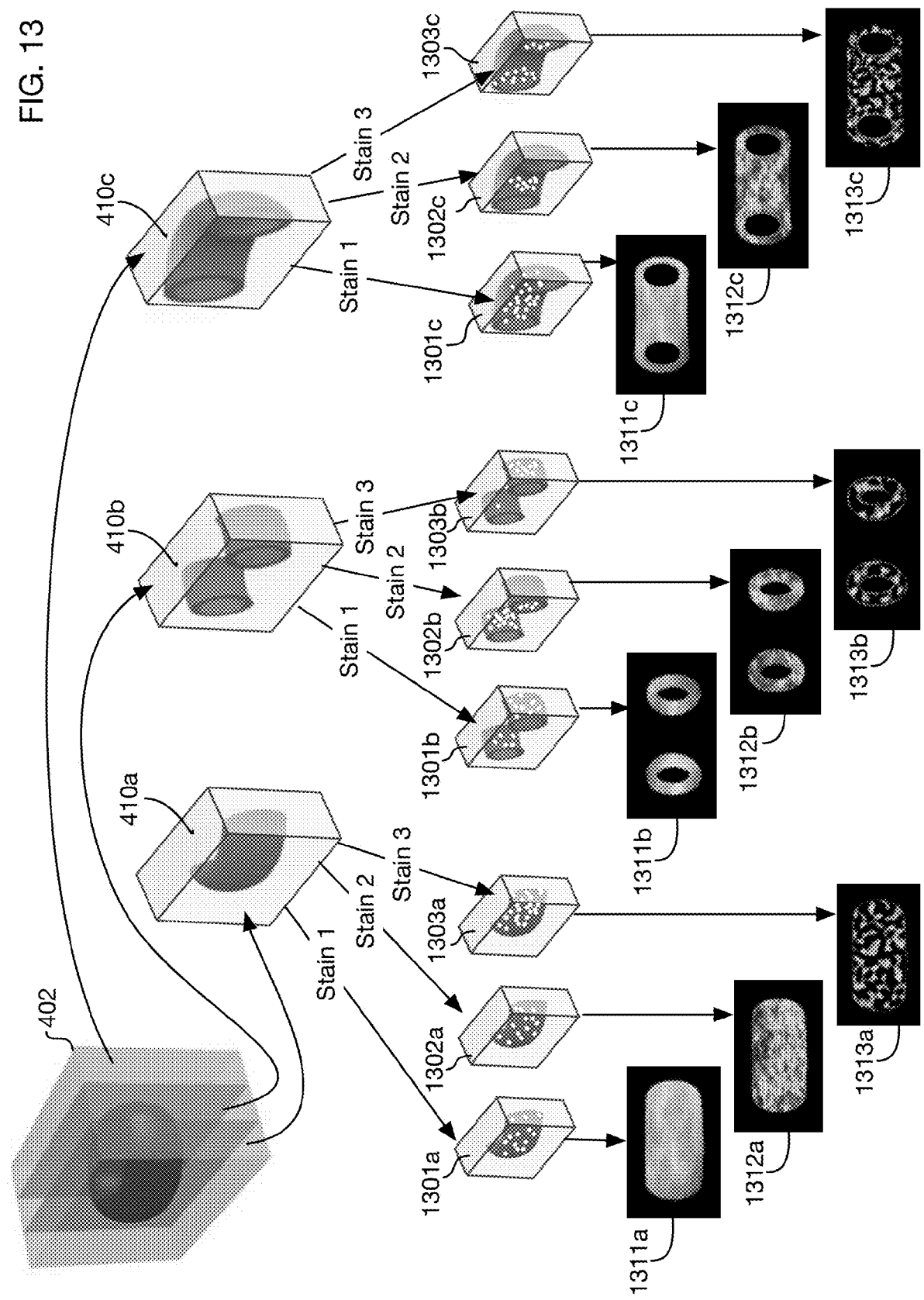
FIG. 13 shows an extension of the 2D image generation of FIG. 4 to generation of an array of images that include different stains.
Figure 14:
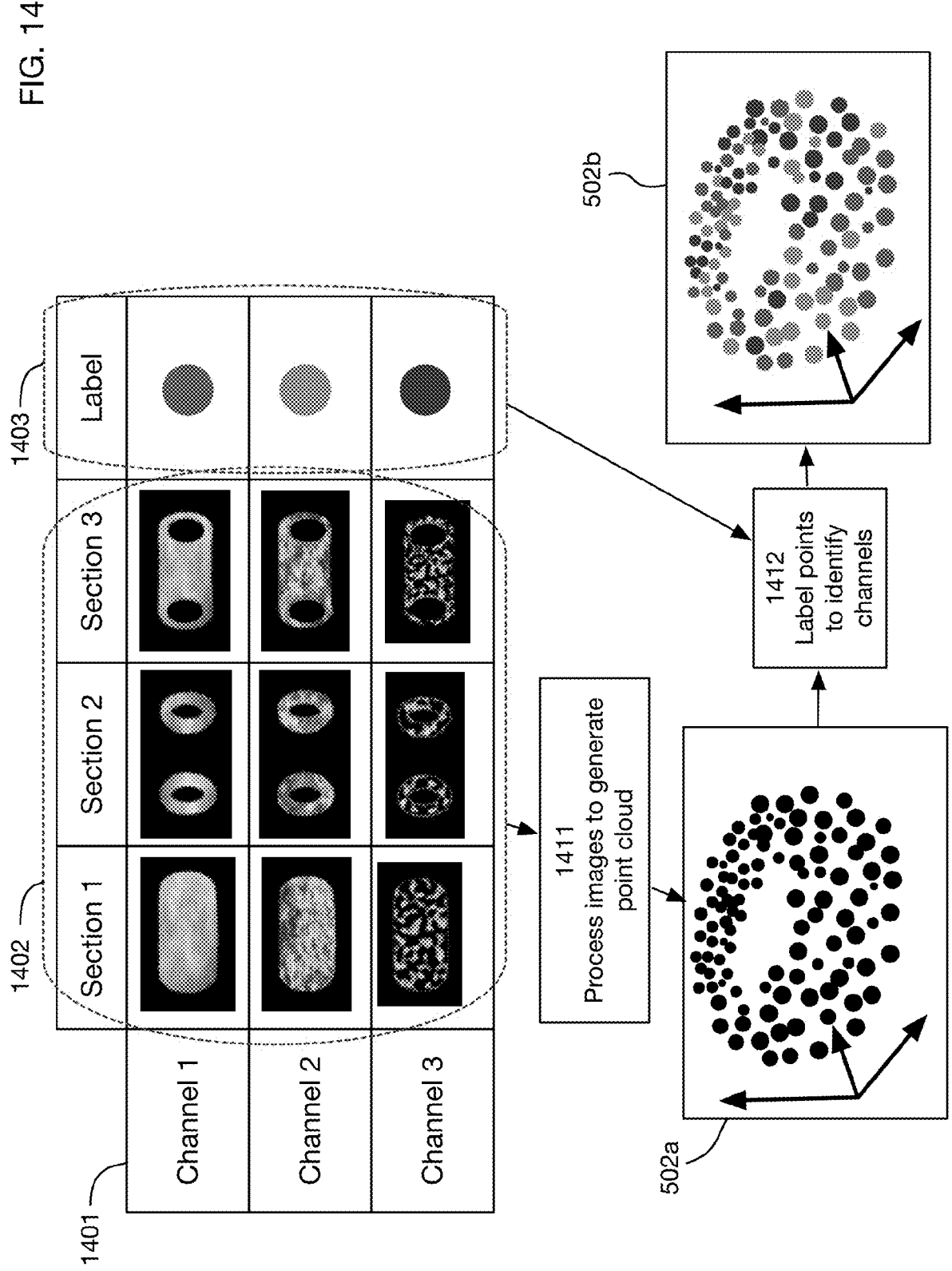
FIG. 14 illustrates mapping the image array of FIG. 13 to a 3D point cloud with colors differentiating the stains.

In one or more embodiments, a 3D point cloud may be constructed from multiple images corresponding to each depth slice of an object, and the point cloud may be partitioned into "channels" that represent these multiple images. FIGS. 13 and 14 show an illustrative example for the slices of object 401 from FIG. 4. In FIG. 13, each of the slices 410a, 410b, and 401c is treated with three different stains. This process generates three samples for each slice: samples 1301a, 1302a, 1303a for slice 410a; samples 1301b, 1302b, 1303b for slice 410b; and samples 1301c, 1302c, 1303c for slice 410c. Each of these samples is imaged (possibly under different wavelengths or other conditions corresponding to stains), yielding three images for each slice: 1311a, 1312a, 1313a for slice 410a; 1311b, 1312b, 1313b for slice 410b; and 1311c, 1312c, 1313c for slice 410c. These images may then be processed as described above to generate 3D points from each image. Point cloud generation is illustrated in FIG. 14. The images 1402 from FIG. 13 may be organized by slice and by "channel" (corresponding in this example to a stain) for example in table 1401. Process 1411 may generate an initial 3D point cloud 502a from the images 1402, and then step 1412 may label each point to identify the channel that it corresponds to. For example, a color label 1403 may be associated with each channel, and the points in the final 3D point cloud 502b may be colored with the label corresponding to the channel associated with the point. One or more embodiments may use any type or types of visual indicators to differentiate points from different channels, including for example, without limitation, any combination of color, size, shape, text, opacity, or texture.

While the invention herein disclosed has been described by means of specific embodiments and applications thereof, numerous modifications and variations could be made thereto by those skilled in the art without departing from the scope of the invention set forth in the claims.

What is claimed is:

1. A visualization system that transforms 2D images of object slices into 3D point clouds, comprising:
   a processor configured to
      obtain a plurality of 2D images of an object, wherein
         said object is divided into a plurality of slices;
         said plurality of slices are substantially parallel to one another and are substantially perpendicular to a depth axis, wherein a spatial reference frame associated with said object comprises said depth axis, a width axis, and a height axis;
         each 2D image of said plurality of 2D images is an image of one slice of said plurality of slices; and,
         each slice of said plurality of slices has a minimum depth and a maximum depth along said depth axis;
      obtain the minimum depth and the maximum depth of the slice associated with said each 2D image;
      obtain or generate a mapping between pixel coordinates and width and height in said spatial reference frame for said each 2D image;
      apply a filter to said each 2D image to generate a corresponding binary mask, wherein pixels of said binary mask have an on value or an off value;
      generate a 3D point corresponding to each pixel of each binary mask having an on value;
      set a width and height of said 3D point based on pixel coordinates of a pixel corresponding to said 3D point, and based on said mapping between pixel coordinates and width and height for the 2D image corresponding to the binary mask containing said pixel;

generate a random number from a probability distribution;

set a depth of said 3D point to said random number; and, combine all 3D points associated with each binary mask corresponding to each 2D image of said plurality of 2D images to form a 3D point cloud.

2. The system of claim 1, wherein
said object comprises a tissue sample; and,
said plurality of 2D images comprise microscopy images of said plurality of slices of said tissue sample.

3. The system of claim 1, wherein
each 2D image of said plurality of 2D images is associated with a channel of a plurality of channels; and,
said processor is further configured to
assign a label to each 3D point corresponding to the channel associated with the 2D image associated with said each 3D point.

4. The system of claim 3, wherein
said object comprises a tissue sample;
said plurality of 2D images comprise microscopy images of said plurality of slices of said tissue sample; and,
each channel of said plurality of channels corresponds to one or both of
a stain applied to said plurality of slices before capturing the 2D images associated with said each channel; and,
one or more wavelengths of light that illuminate said plurality of slices while capturing the 2D images associated with said each channel.

5. The system of claim 3, wherein said label is a color.

6. The system of claim 3, wherein said label comprises one or more of color, size, shape, text, opacity, texture.

7. The system of claim 1, wherein
said filter assigns an on value to a pixel of a binary mask when a corresponding pixel of the 2D image associated with said binary mask has a luminance equal to or exceeding a luminance threshold value; and,
said filter assigns an off value to a pixel of a binary mask when a corresponding pixel of the 2D image associated with said binary mask has a luminance below said luminance threshold value.

8. The system of claim 1, wherein
said filter comprises one or more of noise reduction, smoothing, convolution with a kernel, one or more morphological operations.

9. The system of claim 1, wherein
said probability distribution is a uniform distribution in a range between said minimum depth and said maximum depth of said slice associated with said 2D image corresponding to the binary mask containing the pixel corresponding to said 3D point.

10. The system of claim 1, wherein
said processor is further configured to
determine a region of pixels in said binary mask corresponding to said 3D point, wherein said pixel in said binary mask corresponding to said 3D point is contained in said region;
calculate a size of said region; and,
said probability distribution is a function of said size of said region.

11. The system of claim 10, wherein region comprises pixels in said binary mask that have on values and that are connected to said pixel in said binary mask corresponding to said 3D point by a path of contiguous pixels with on values.

12. The system of claim 10, wherein said size of said region is an area of a convex hull containing said region.

13. A visualization system that transforms 2D images of object slices into 3D point clouds, comprising:
a processor configured to
obtain a plurality of 2D images of an object, wherein said object is divided into a plurality of slices;
said plurality of slices are substantially parallel to one another and are substantially perpendicular to a depth axis, wherein a spatial reference frame associated with said object comprises said depth axis, a width axis, and a height axis;
each 2D image of said plurality of 2D images is an image of one slice of said plurality of slices;
each 2D image of said plurality of 2D images is associated with a channel of a plurality of channels; and,
each slice of said plurality of slices has a minimum depth and a maximum depth along said depth axis;
obtain the minimum depth and the maximum depth of the slice associated with said each 2D image;
obtain or generate a mapping between pixel coordinates and width and height in said spatial reference frame for said each 2D image;
apply a filter to said each 2D image to generate a corresponding binary mask, wherein pixels of said binary mask have an on value or an off value, wherein
said filter assigns an on value to a pixel of a binary mask when a corresponding pixel of the 2D image associated with said binary mask has a luminance equal to or exceeding a luminance threshold value; and
said filter assigns an off value to a pixel of a binary mask when a corresponding pixel of the 2D image associated with said binary mask has a luminance below said luminance threshold value;
generate a 3D point corresponding to each pixel of each binary mask having an on value;
set a width and height of said 3D point based on pixel coordinates of a pixel corresponding to said 3D point, and based on said mapping between pixel coordinates and width and height for the 2D image corresponding to the binary mask containing said pixel;
determine a region of pixels in said binary mask corresponding to said 3D point, wherein said region comprises pixels in said binary mask that have on values and that are connected to said pixel in said binary mask corresponding to said 3D point by a path of contiguous pixels with on values;
calculate a size of said region as an area of a convex hull containing said region;
generate a random number from a probability distribution, wherein said probability distribution is a function of said size of said region;
set a depth of said 3D point to said random number;
assign a label to each 3D point corresponding to the channel associated with the 2D image associated with said each 3D point, wherein said label comprises a color; and,
combine all 3D points associated with each binary mask corresponding to each 2D image of said plurality of 2D images to form a 3D point cloud.

* * * * *

UNITED STATES PATENT AND TRADEMARK OFFICE
CERTIFICATE OF CORRECTION

PATENT NO. : 10,964,094 B1
APPLICATION NO. : 16/778632
DATED : March 30, 2021
INVENTOR(S) : Passmore et al.

Page 1 of 1

It is certified that error appears in the above-identified patent and that said Letters Patent is hereby corrected as shown below:

On the Title Page

Item (54), and in the Specification Column 1 Lines 1-3 Replace "VISUALIZATION SYSTEM THAT TRANSFORMS 2D IMAGES OF OBJECTS SLICES INTO 3D POINT CLOUDS" with
--VISUALIZATION SYSTEM THAT TRANSFORMS 2D IMAGES OF OBJECT SLICES INTO 3D POINT CLOUDS--.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*